US 8,832,814 B2

(12) United States Patent
Coletta et al.

(10) Patent No.: US 8,832,814 B2
(45) Date of Patent: *Sep. 9, 2014

(54) SYSTEM AND METHOD FOR PROVIDING ACCESS TO A SOFTWARE APPLICATION

(71) Applicant: FMR LLC, Boston, MA (US)

(72) Inventors: Michael Timothy Coletta, Marshfield, MA (US); Kevin W. Park, Cranston, RI (US); Jon Alexander Lenzer, Fort Worth, TX (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,190

(22) Filed: Jul. 2, 2013

(65) Prior Publication Data

US 2014/0123259 A1 May 1, 2014

Related U.S. Application Data

(63) Continuation of application No. 13/665,119, filed on Oct. 31, 2012, now Pat. No. 8,484,711.

(51) Int. Cl.
*G06F 15/16* (2006.01)
*H04L 29/06* (2006.01)
*G06F 21/41* (2013.01)
*H04L 29/08* (2006.01)

(52) U.S. Cl.
CPC ............... *G06F 21/41* (2013.01); *H04L 63/00* (2013.01); *H04L 67/146* (2013.01); *H04L 67/141* (2013.01); *H04L 63/0815* (2013.01); *H04L 67/2814* (2013.01)
USPC ................ 726/8; 726/1; 726/2; 726/3; 726/4; 726/5; 726/6; 726/7; 709/227; 709/228; 705/35; 705/7.12; 705/7.13; 713/151

(58) Field of Classification Search
CPC ..... G06F 21/41; G06F 21/31; G06F 21/6218; G06F 2221/2149; H04L 63/08; H04L 63/00; H04L 63/0407; H04L 67/00; H04L 67/02; H04L 67/141; H04L 67/146; H04L 67/2814; H04L 67/306; H04L 63/0815; H04L 63/0281; H04L 63/02; H04L 63/0236; H04L 63/029; H04L 63/0428; H04L 63/0807; H04L 63/162; H04L 67/28; H04L 67/2823
USPC .......... 726/1–8, 11–14, 17–19; 709/227–228; 705/35, 7.12, 7.13; 713/151
See application file for complete search history.

(56) References Cited

U.S. PATENT DOCUMENTS 7,426,642 B2    9/2008 Aupperle et al.
7,757,074 B2 *  7/2010 Sundarrajan et al. ......... 713/151

(Continued)

*Primary Examiner* — Thanhnga B Truong
(74) *Attorney, Agent, or Firm* — Proskauer Rose LLP

(57) ABSTRACT

System and method configured to provide an access management system configuration that provides the benefits of single sign-on while reducing internal hardware and administration maintenance costs. The system is reconfigured to provide an access control module that directs authentication network traffic such that access management agents are not required to be installed on the application server for each protected application. The system provides a redirection of a login request from the application server to an external security gateway that authenticates the user via policy and sends authenticated user credentials on a back channel to the access control module to obtain a session cookie which is redirected back to the user so the user can establish a session with the application. The solution reduces the plethora of agents to be maintained and upgraded in order to remain compatible with the evolving hosting software, reducing both hardware and administration maintenance costs.

19 Claims, 7 Drawing Sheets

(56) References Cited

U.S. PATENT DOCUMENTS

| | | |
|---|---|---|
| 7,941,533 B2 | 5/2011 | Miller et al. |
| 8,020,195 B2 | 9/2011 | Frost et al. |
| 8,275,652 B2 | 9/2012 | Hafeman et al. |
| 8,533,804 B2 * | 9/2013 | Ho et al. .......... 726/8 |
| 2010/0211686 A1 | 8/2010 | Poikselka |
| 2011/0283347 A1 | 11/2011 | Bhuta et al. |

* cited by examiner

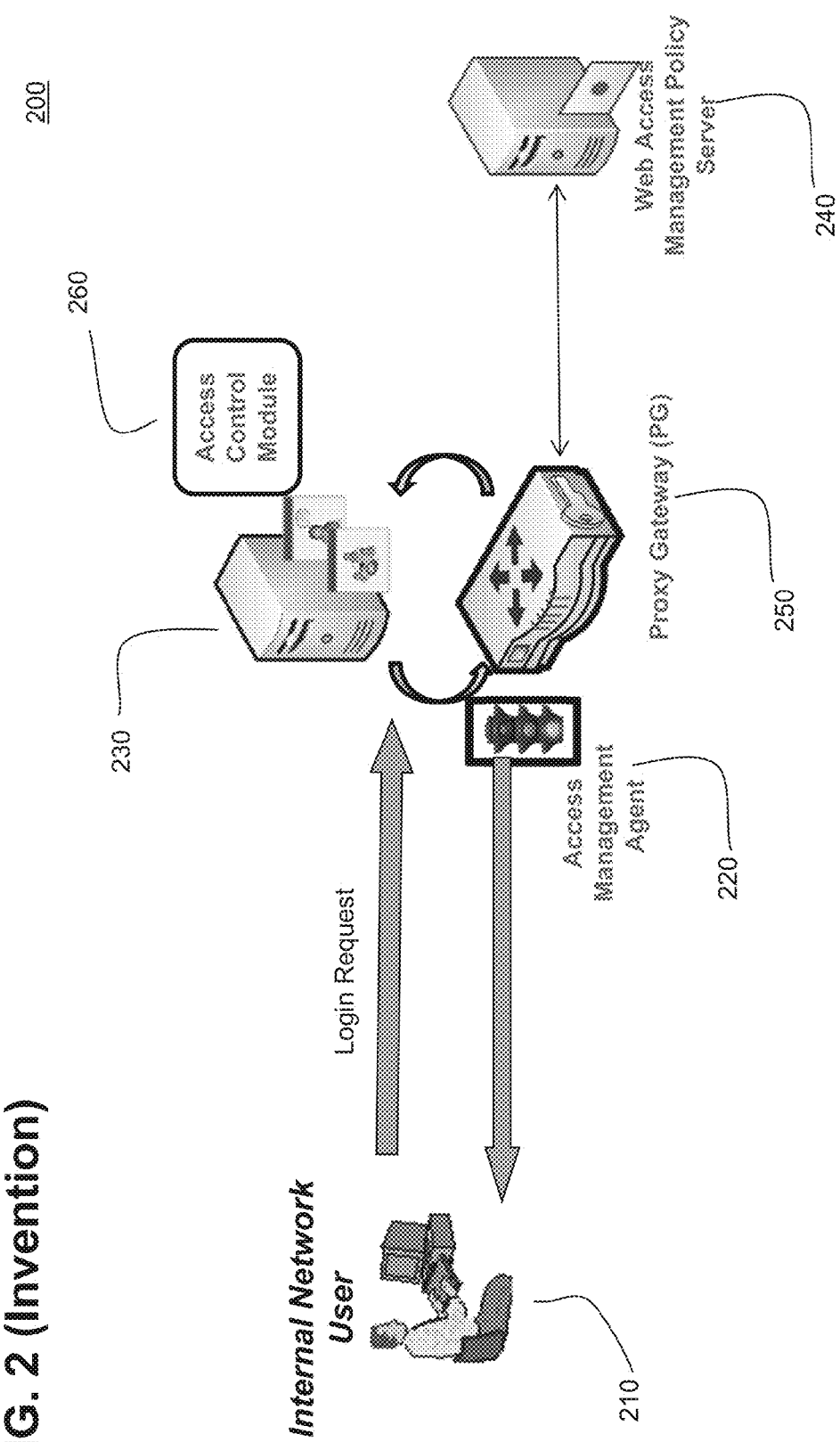
FIG. 2 (Invention)

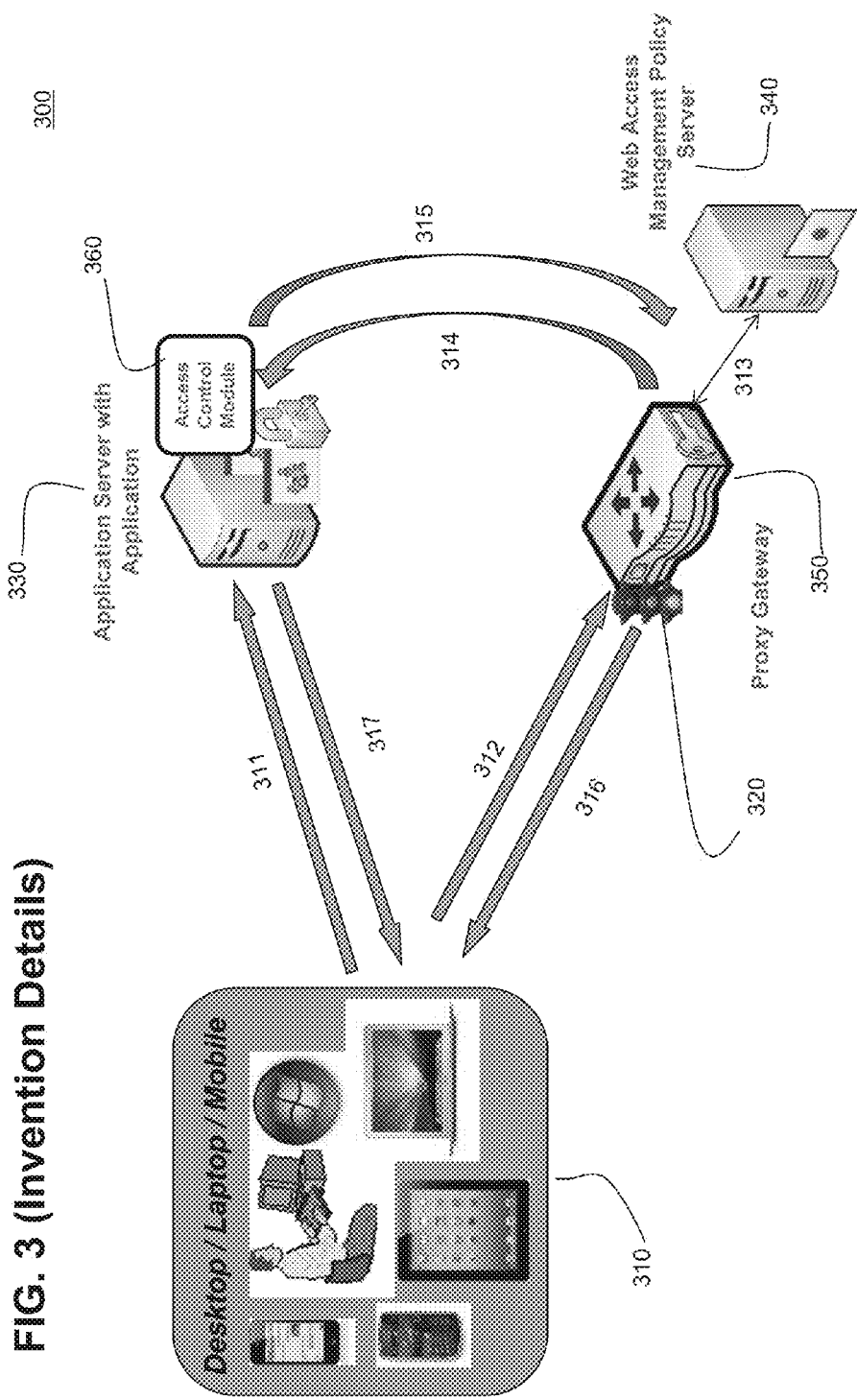
FIG. 3 (Invention Details)

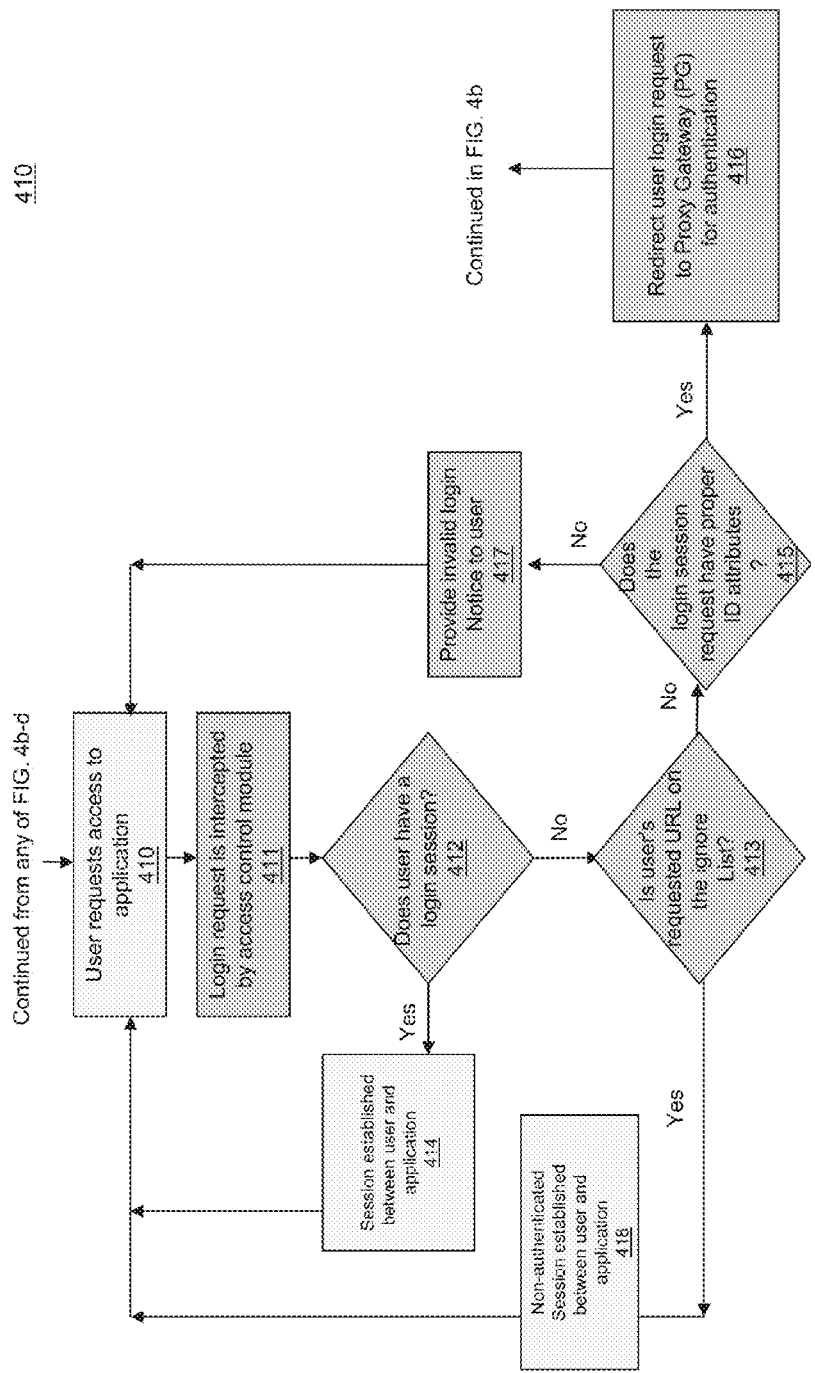

(System Flow Chart)

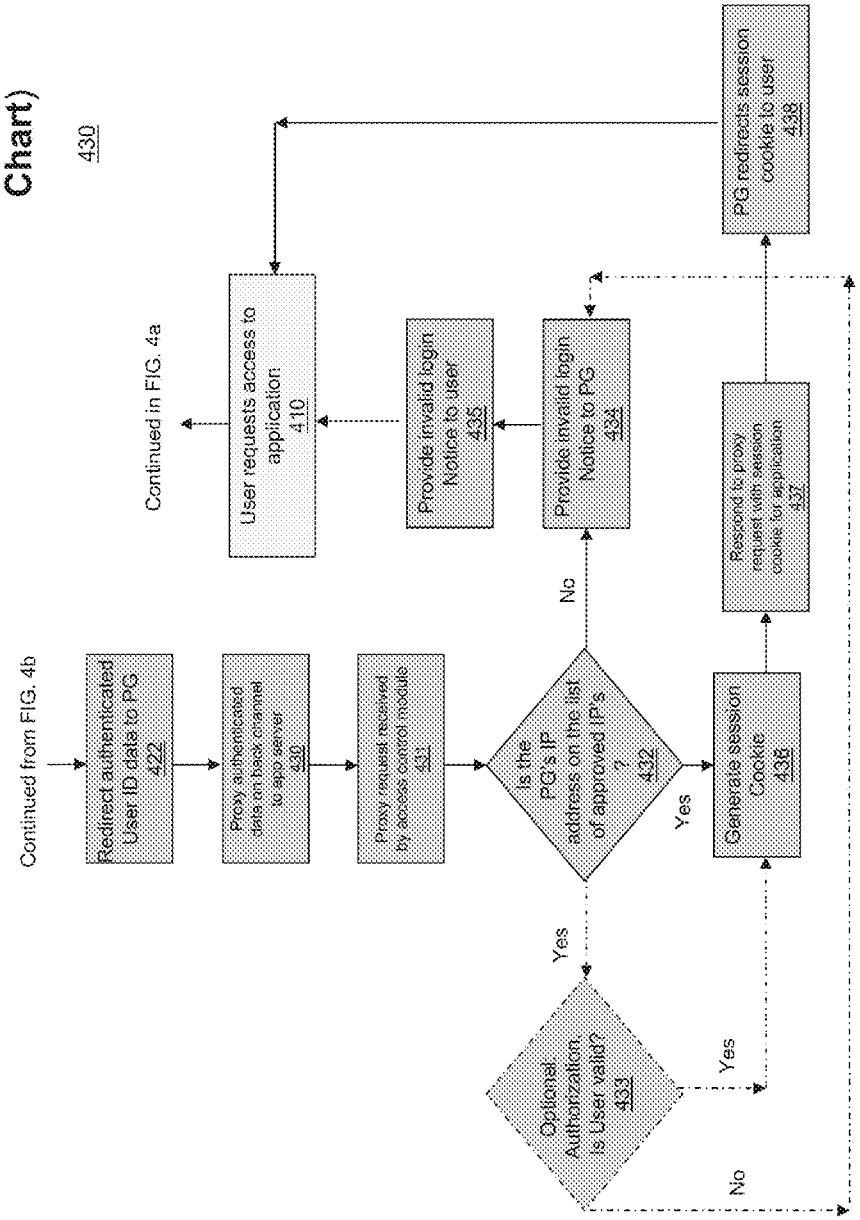

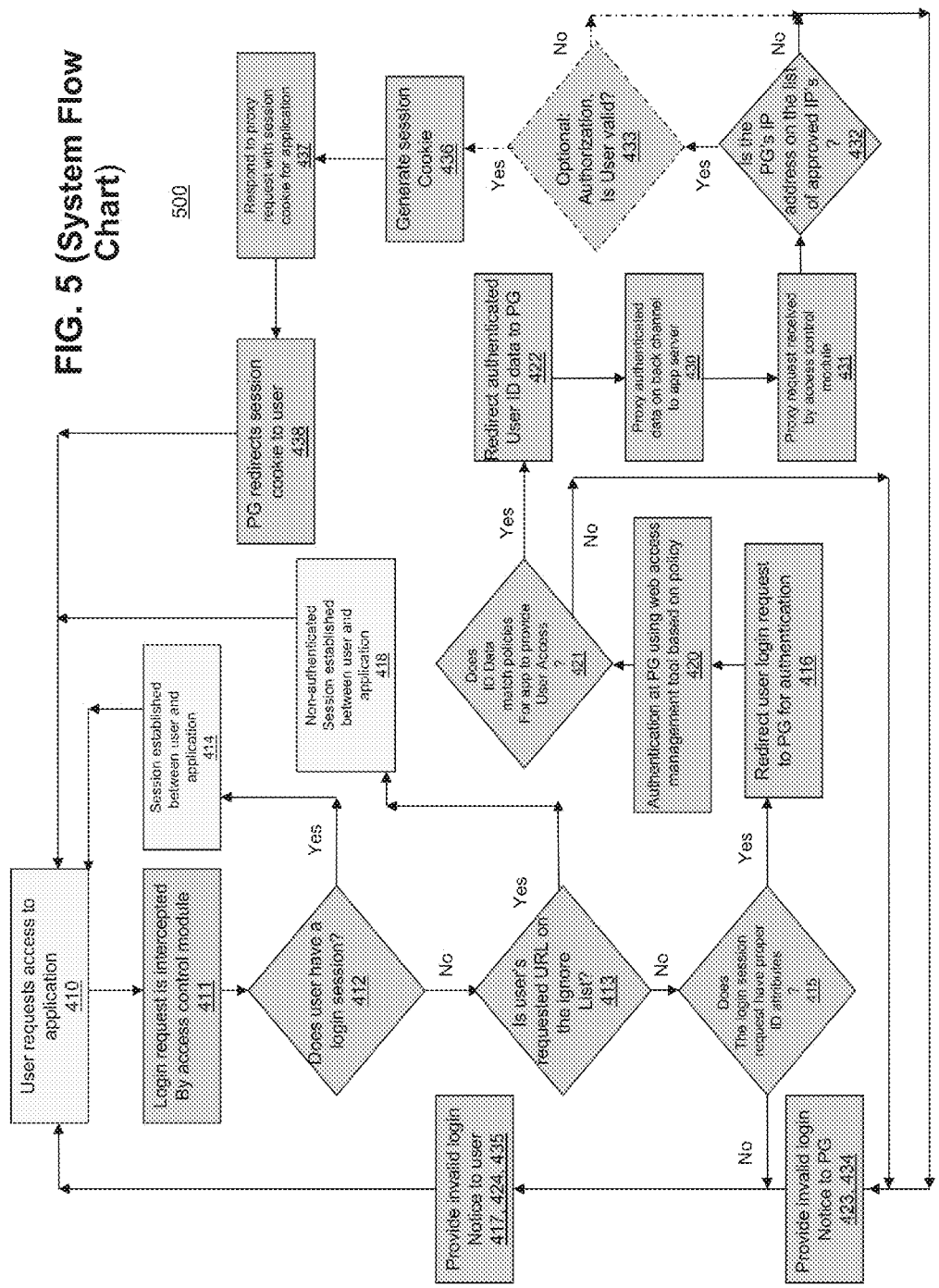
FIG. 5 (System Flow Chart)

SYSTEM AND METHOD FOR PROVIDING ACCESS TO A SOFTWARE APPLICATION

CROSS-REFERENCE TO RELATED APPLICATIONS

This application is a continuation of U.S. patent application Ser. No. 13/665,119, filed on Oct. 31, 2012, which is owned by the assignee of the instant application the entire contents of which are hereby incorporated herein in its entirety.

FIELD OF INVENTION

The invention relates generally to session management, and more particularly to single sign-on session management in which single sign-on authentication, across multiple systems or applications, is accomplished using an access control module resident on an application server in communication with a gateway server and policy server.

BACKGROUND

Typically, protected resources on a system or server require the user to provide some form of authentication credentials before the protected resources can be accessed by the user. For example, a user via a computer on a browser application connects to a server over the Internet and attempts to access or otherwise utilize a protected resource on the server. Before allowing access, the server verifies that the user is allowed to use the protected resource using a login process. The login process can be a simple validation process of comparing the user's authentication credentials or other information to a list of valid user authentication information. Once the login process is completed by the user and is successful, the user is authenticated and a session is established between the user and the server. As applications, systems, and server configurations have developed, however, users now commonly desire to access a plurality of protected resources including a plurality of protected resources on multiple servers. If such resources or servers do not communicate with each other, the user is forced to login to each resource and/or server individually. This is burdensome and time consuming for the user, so single sign-on methods were developed.

Single sign-on (SSO) is a form of access control of multiple related, but independent, software systems where a user logs in only once and is authenticated fir multiple systems without being prompted to login to each individual system or application. Perhaps better described as single point authentication, the SSO process takes the authentication information of a user and spins off various computational activity to separately authenticate or login the user to multiple applications, systems, or servers behind the scenes. Behind the scenes authentication provides the user the appearance of seamless access to multiple protected resources after one login. i.e. after being prompted for authentication only once.

In addition to the user's convenience of logging-in only once for multiple protected resources, the SSO process provides other benefits as well. For example, SSO provides a reduction in password fatigue, reduction in time spent re-entering passwords, reduction in IT costs due to inquiries regarding passwords, security without the inconvenience of prompting the user repeatedly, centralized reporting for compliance adherence, user convenience of not remembering multiple username/password combinations for multiple systems and applications, and centralized authentication servers to be utilized for authentication purposes by all other applications, systems and servers. The SSO process, however, is also replete with vulnerabilities due to possible authentication information compromises, SSO provides access to multiple resources once the user is initially authenticated and, in a sense, provides the "keys to the castle." The process increases negative impacts caused when the authentication information is obtained by other persons and is misused. SSO therefore requires an increased focus on protecting the users' authentication information and is generally combined with other authentication methods such as one-time passwords, tokens, and/or SSO management servers. Examples of such SSO management servers are the GETACCESS system of ENTRUST by Plano Tex., and the CA SITEMINDER system by COMPUTER ASSOCIATES of Islandia, N.Y. Such systems commonly deploy a central session management server connected to the protected resource servers. The centralized access management system enables user authentication and SSO as well as policy-based authorization, identity federation, and auditing of access to applications, portals, and other protected resources. In some configurations, these systems are hosted on a single server. In other configurations, a number of servers host the central session management system, and the individual servers inter-connect to act as a single logical server. In either configuration, the session management servers are centralized to provide one central location to check for session invalidity and a single point for managing and controlling the sessions within the system.

Traditional session management servers protect access to the resources on the servers by validating the session credentials of the user trying to gain access. The typical configuration consists of access management agents installed and running on each server hosting a protected resource, where each agent corresponds to a specific protected resource. For instance, if several enterprise applications are running on an application server, an application-specific access management agent is deployed on the server for each protected application. The application-specific access management agent is called whenever a user requests access to the specific application on the application server managed by the application-specific access management agent. The corresponding agent called intervenes in the request and collects the user's session credentials. The access management agent then communicates these session credentials to an external policy server for validation. The policy server includes policies and rules regarding authentication of a user, which can include when the user last logged in, how many access attempts have been made, and logging data related to these policy questions. The policy server evaluates these policies against the user's credentials and determines whether a user is valid. If valid, the policy server returns a form of session ID allowing a session to be created between the user and the protected application.

A benefit to this configuration is the access management agents are highly customizable for the needs of a particular server. This benefit, among the other benefits of the SSO process, however, comes at a cost. As mentioned above, a specific access management agent is required for each protected application. Additionally, an agent is required for every protected server and application on every platform and potentially even for every version of every protected resource. Thus, for one application there can be several access management agents to cover the application on different platforms and in different versions. Further, as technology evolves and a server or application is updated, the plethora of agents must also be upgraded to remain compatible with the evolving hosting software. The continual installation and upgrade process across a multitude of agents, of course, affects both hardware and software administration maintenance costs.

High-end hardware is generally necessary to efficiently run the access management configuration because the centralized access point effects and limits network performance by imposing additional network traffic via a single point of validation traffic. As users continually expect greater performance levels, any increase in the time (e.g., several seconds) it takes to respond due to network traffic loads can cause the user to give up on accessing the resource. Therefore, better hardware is required to maintain user expectations. In addition, administration of this configuration generally requires a trained and exclusive staff for managing the installation, upgrades, policies etc. associated with any old and/or new applications, which of course comes with the costs of hiring, training and keeping a full time staff. Finally, the concept of such access management is similar to that of a firewall and typically requires adhering to auditing requirements. Public, health-related, and larger companies generally spend large amounts of time and money auditing these access management infrastructures to ensure their compliance as vital enforcement points for various internal and external applications.

The cost of keeping and maintaining an access management infrastructure is necessary and useful in today's technological world. However, it can be greatly improved by reducing the burden of implementing a secure infrastructure. What is needed is an access management system configuration that still provides the benefits of SSO while reducing companies' internal hardware and software administration and maintenance costs.

Other aspects of the invention will become apparent from the following detailed description, taken in conjunction with the accompanying drawings, illustrating the principles of the invention by way of example only.

SUMMARY OF TIE INVENTION

The apparatus and methods consistent with this invention overcome the hardware and software administration and maintenance issues of a access management system in the prior art by providing, in various embodiments, a hardware configuration and a computer implemented method for providing access to a software application resident on an application server in which the application server receives a login session request from a user-operated computing device over a first communication channel. The login session request can include the user's session credentials, the identity data for the user-operated computing device, and identification attributes. The invention provides an access control module installed on the application or web server and that intercepts any such incoming login session requests from user-operated computing devices. As used herein, the terms application, resource, web application and enterprise application can be used interchangeably. When the access control module intercepts an incoming login session request, the access control module transmits the request over the first communication channel, relaying the request through the user-operated computing device's connection and redirecting the request over a second communication channel to a proxy gateway. The relay of the request can be completed by the access control module via a redirect command that indicates no session exists for the user-operated computing device with the requested application. To do so, the access control module takes the identity data attributes from the intercepted login request and compares the attributes to the specified identity data attributes for the application. For instance, the application might require specific characters, i.e. specified configurations of letters and numbers, for usernames and passwords. The access control module then determines whether the identity data attributes of the login session request are consistent with the specified identity data attributes for the application. If so, the access control module creates a redirect command indicating no session exists for the user-operated computing device with the particular application. The redirect communication is relayed through the user-operated computing device and received by the proxy gateway over a second communication channel. The proxy gateway, external from the application server, has application-specific access management agents for facilitating authentication of the identity data for each of the specific applications to be accessed by the user. When the login session request is communicated to the proxy gateway, the application specific access management agent is called for the particular application requested in the login session request. The application specific access management agent collects the user's session credentials and proxies these to the web access management policy server, or policy server, for validation. Authentication or validation of the user's identity data is completed by the policy server, which evaluates the user's session credentials against the policies in place for the application requested. The policy server determines whether the user is validated or not and sends the validation determination back to the proxy gateway. If validated, the proxy gateway sends a proxy request over a third communication channel, or "back channel," which communicates the user's authenticated identity data to the access control module on the application server. The access control module receives the proxy request from the proxy gateway over the back channel. Before responding, the access control module validates that the proxy request received was sent over the back channel from a known and/or valid proxy gateway. The proxy gateway's identity is authenticated to ensure no proxy request for session cookies comes from an invalid gateway or an unauthorized gateway. Once the proxy request's origin is validated, the access control module transmits a response to the proxy request from the proxy gateway. The response to the proxy request comprises a session cookie generated by the access control module. The proxied response is communicated over the third and second communication channels respectively (i.e. communicated via the third channel through the proxy gateway and over the second channel to the user-operated computing device). The session cookie is redirected from the user-operated computing device, over the first communication channel, to the access control module. Upon receipt of the session cookie, the access control module allows the user-operated computing device to pass through the access control module in order to establish a session with the application. The session cookie is then used to establish a session between the user-operated computing device and the application.

In one embodiment, the invention further provides adding a uniform resource locator (URL) to an ignore list. When a user login session request is intercepted by the access control module, and the session request is seeking a session with a URL, the access control module determines whether the requested URL is on the ignore list. A URL on the ignore list can contain unprotected resources or content making the authentication process unnecessary to access that particular URL. For example, a login page is an unprotected URL or resource that should be accessible by the user without going through the authentication process. If the URL requested is on the ignore list, the access control module ignores the request, i.e. allows the request to pass through to the URL requested without intercepting it for authentication, such that the user-operated computing device can establish an unauthenticated session with the URL, i.e. create a session without proceeding through the authentication process.

In one embodiment, the invention can further provide for the access control module to track the number of subsequent requests made by the user-operated computing device after a session has been established. The access control module can be programmed to allow the user's subsequent login session requests to pass through to the application for a predetermined number of subsequent requests without re-authenticating the user-operated computing device. After the predetermined number of subsequent requests has been reached, the access control module again intercepts the login session requests and sends the requests through the authentication process of the invention herein described. In another embodiment, the access control module can be programmed to allow the user's session request through to the application for a predetermined amount of time after a session has been established without re-authenticating the user-operated computing device. After the predetermined amount of time has been reached, the access control module again intercepts the login session requests and sends the requests through the authentication process of the invention herein described.

In one embodiment, the access control module can handle user login session requests from a plurality of applications. To handle a plurality of applications, the invention can further provide a list of applications to be controlled by the access control module. The list of applications includes applications whose login session requests are intercepted by the particular access control module and handled by the access control module. This list of applications can be updated so that the access control, module is updated to handle additional applications. The list of applications can be accessed by the access control module to determine whether the login session request should be intercepted or whether the login session request should be allowed to pass through to the application.

Similarly, in another embodiment, the access control module can be configured to handle proxy requests from a plurality of proxy gateways. To handle a plurality of proxy gateways, the invention further provides a list of valid proxy gateways. The list includes each valid proxy gateway by its internet protocol (IP) address such that the validation process is a simple comparison of IP addresses. In other words, when a login session request proceeds through the authentication process and the proxy gateway proxies the validated identity data to the access control module on the back channel, the access control module can verify that the proxy gateway sending the proxy request is a valid proxy gateway by first extracting the proxy gateway's IP address from the proxy request and comparing it to the IP addresses in the list of valid proxy gateway IP addresses. If the proxy gateway's IP address is found in the list, the proxy gateway is valid and the access control module can proceed to send a session cookie for the requested application within its proxy response. If the proxy gateway's IP address is not found in the list, i.e. it is determined by the access control module that the proxy gateway internet protocol address is not in the list, the access control module provides a notice to the user-operated computing device making the login session request a notice, via the proxy gateway, indicating the login session request is invalid.

In one embodiment, the invention further provides calling the necessary application-specific internet access management agent when the login session request is redirected to the proxy gateway. The application-specific internet access management agents are placed externally on the proxy gateway and do not have to be independently managed by the application server. Each application-specific internet access management agent is, as named specific to each application. When the proxy gateway receives the login session request, the proxy gateway determines which application was requested and calls the appropriate application-specific internet access management agent. The request is then passed to the application-specific internet access management agent. The application-specific internet access management agent receives the login session request, including the identity data for authorization, and determines whether the application, server, or URL requested access to in the login session request is a protected. If the login session request requests access to a protected resource, the application-specific internet access management agent gathers the identity data from the request for authorization by the web access management policy server. The application-specific internet access management agent transmits the identity data to the policy server for authorization. The policy server determines whether the identity data received from the application-specific internet access management agent is valid. If valid, the policy server transmits the authenticated identity data back to the application-specific internet access management agent on the proxy gateway indicating that the identity data has been authenticated. The authenticated identity data received from the policy server is then transmitted to the proxy gateway by the application-specific internet access management agent. If invalid, the policy server transmits a notice of invalid identity data for the user-operated computing device for the application. The application-specific internet access management agent on the proxy gateway receives the notice of invalid identity data and relays the notice to the user-operated computing device.

The hardware and software configuration of the present invention creates an extreme reduction in maintenance time and upgrade time which in turn diminishes the necessary system down time for such maintenance and upgrades. Moreover, the invention allows maintenance staff to keep up with evolving technology, which in turn produces a more up to date system, more capable and therefore more secure. The network traffic across a linear configuration of existing systems is known to create network lag as the communications must go to and from a single point of access, i.e. through the application server to the policy server and back again. Subsequently, efficiency of management and control of login sessions in existing systems depends on the number of connecting user-operated computing devices. The three channels of communication in the present invention configuration can provide some relief across the communication lines and has the potential for improvement on this point of efficiency. Additionally, in another embodiment, the invention can be configured with more than one proxy gateway. The additional gateways can assist in potential overload issues as well, because the additional gateways are able to provide additional avenues for the authentication process and cut down back log by distributing the network load of additional communications across multiple gateways. Another benefit is the access control module can be configured for multiple applications on one platform, whereas the access management agents must be configured for each version of each application on each platform. At most, an access control module is necessary for each platform. Thus, a one to many relationship is created in place of a many to one relationship which again reduces maintenance and upgrade time and resources.

Other aspects of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention as well as the invention itself will be more fully understood from the follow description of various embodiments, when read together with the accompanying drawings.

FIG. 2 is a comparative depiction of the invention configuration for an access management system, for comparison to FIG. 1.

FIG. 3 is a more detailed depiction of the invention configuration and communication channels between the hardware components of the invention.

FIG. 4a is the first portion of the entire system flow chart.

FIG. 4c is the third and last portion of the entire system flow chart.

FIG. 5 depicts the entire system flow chart, and includes the elements shown in FIGS. 4a, 4b and 4c.

DETAILED DESCRIPTION

Figure 1:
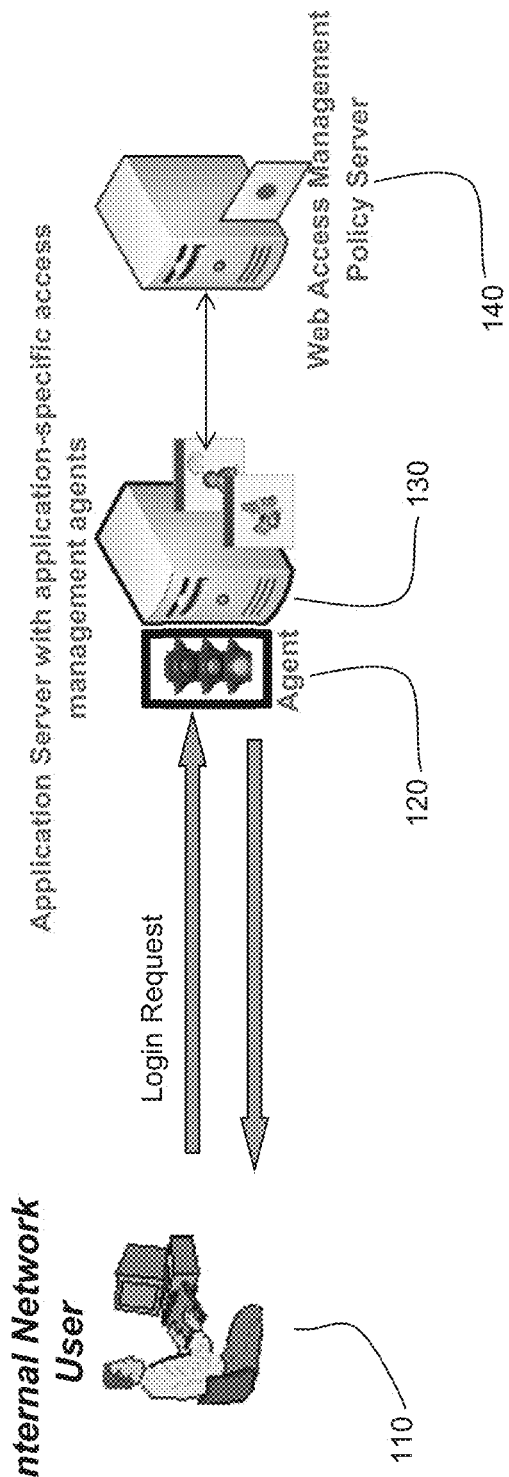
FIG. 1 is a depiction of the prior art configuration for a centralized access management system.

FIG. 1 demonstrates the traditional session management server configuration 100. The system configuration 100 consists of access management agents 120 installed on a server 130 hosting protected resources. Each agent 120 is associated with a specific protected resource. If several applications are running on an application server 130, an application-specific access management agent 120 is deployed on the server 130 for each protected application. The application-specific access management agent 120 is called whenever a user 110 requests access to a specific application on the application server 130. When called, the corresponding agent 120 intervenes in the request and collects the user's session credentials. The access management agent 120 then communicates these session credentials to a policy server 140 for validation. The policy server 140 is generally separate from and external to the application server 130. The policy server 140 includes policies and rules regarding authentication of a user 110, which can include when the user 110 last logged in, how many access attempts have been made, and logging data related to these policy questions. The policy server 140 evaluates these policies against the user's credentials and determines whether a user 110 is valid. If valid, the policy server 140 returns a form of session ID allowing a session to be created between the user 110 and the protected resource on the application server 130.

With this system configuration 100, a specific access management agent 120 is required to be installed for each protected application and each protected resource, on every platform and potentially even for every version of every application or resource. All of the agents 120, in turn, must be maintained and upgraded impacting both hardware and software administration maintenance costs. Vendors are typically required to support large matrices of platforms and configurations to support the complexity and proliferation of agents installed, and this contributes to the high costs associated with large agent deployment. To add to the complexity, new technologies (such as Pylon, Python, Ruby on Rails) new application servers, and cloud life cycle management are providing infrastructure and software challenges faster than security solutions can be provided (i.e. installs, upgrades and maintenance of specific access management agents) on the current system configuration 100.

FIG. 2 is a simplified depiction of the present invention showing the additional pieces of hardware necessary for the configuration, and the placement of the hardware and software components. The access control module 260 is installed on the application server 230. The proxy gateway 250 is added to the configuration. The application-specific access management agents 220 are placed separate from and external to the application server 230 on the proxy gateway 250. This external placement of the access management agents 220 allows the installment, upgrade and maintenance of the access management agents 220 to be external to the application server 230 as well. Maintenance for the application server 230 owner is therefore significantly reduced and redirected to an external system 250 and the gateway owner. The application server owner instead only needs to maintain the application server 230 and the access control module 260. The access control module itself can be a simple mobile collection of scripts to handle incoming requests and proxy requests, receiving and redirecting to and from communications from the user-operated computing device 210 and the proxy gateway 250. Usage of such scripts off loads the security to the proxy gateway 250 in conjunction with the web access management policy server 240 for processing and overall lightens the solution to be maintained on the application server 230. Additionally, such simple and high level scripts can easily be cloned for various platforms such as for Tomcat, TcServer, WAS and Oracle and more quickly than software for the traditional access management agents 220 which must be written for each application and registered with each application. Additionally, such light and portable scripting for the access control module 260 is neither machine compiled nor requires the vendor's certification, significantly reducing maintenance efforts normally required for compiling, assessing the necessary access management agent, and obtaining certification for the access management agent from the agent's vendor.

Referring now to FIG. 3, one embodiment of the invention 300 is illustrated. The embodiment of FIG. 3 provides a more detailed depiction of the system, configuration 200 and the communication channels between the hardware components that comprise the system configuration 300. In the illustrated embodiment, the user-operated computing device 310 can be one of a plurality of devices including but not limited to desktop computers, laptop computers, smart phones, computing pads, and hand held computing devices. When the user-operated computing device 310 requests a session with an application 311 on an application server 330, the request proceeds directly to the application server 330. The process begins over a first communication channel 311 between the user-operated computing device 310 and the application server 330. This communication over the first communication channel 311 is intercepted by the access control module 360. The access control module 360 redirects this request 317 to a proxy gateway 350 by relaying the request back across the first communication channel 317 through the user-operated computing device 310 and over a second communication channel 312 to the proxy gateway 350. When the request is received at the proxy gateway 350, access management agents 320 resident on the proxy gateway 350 deliver the user's session credentials over an external channel 313 to the policy server 340 for authentication. Authenticated data is sent back 313 to the access management agents 320 resident on the proxy gateway 350. If valid, the proxy gateway sends a proxy request over a back channel 314 to the access control module 360 resident on the application server 330. The back channel 314 is a third communication channel 314 between the application server 330 and the proxy gateway 350. If the proxy gateway 350 is an authorized gateway of the system, the access control module 360 relays a session cookie back to the user 310 across the third communication channel 315 and to the user-operated computing device 310 via the proxy gateway 350 and the second communication channel 316.

Figure 4B:
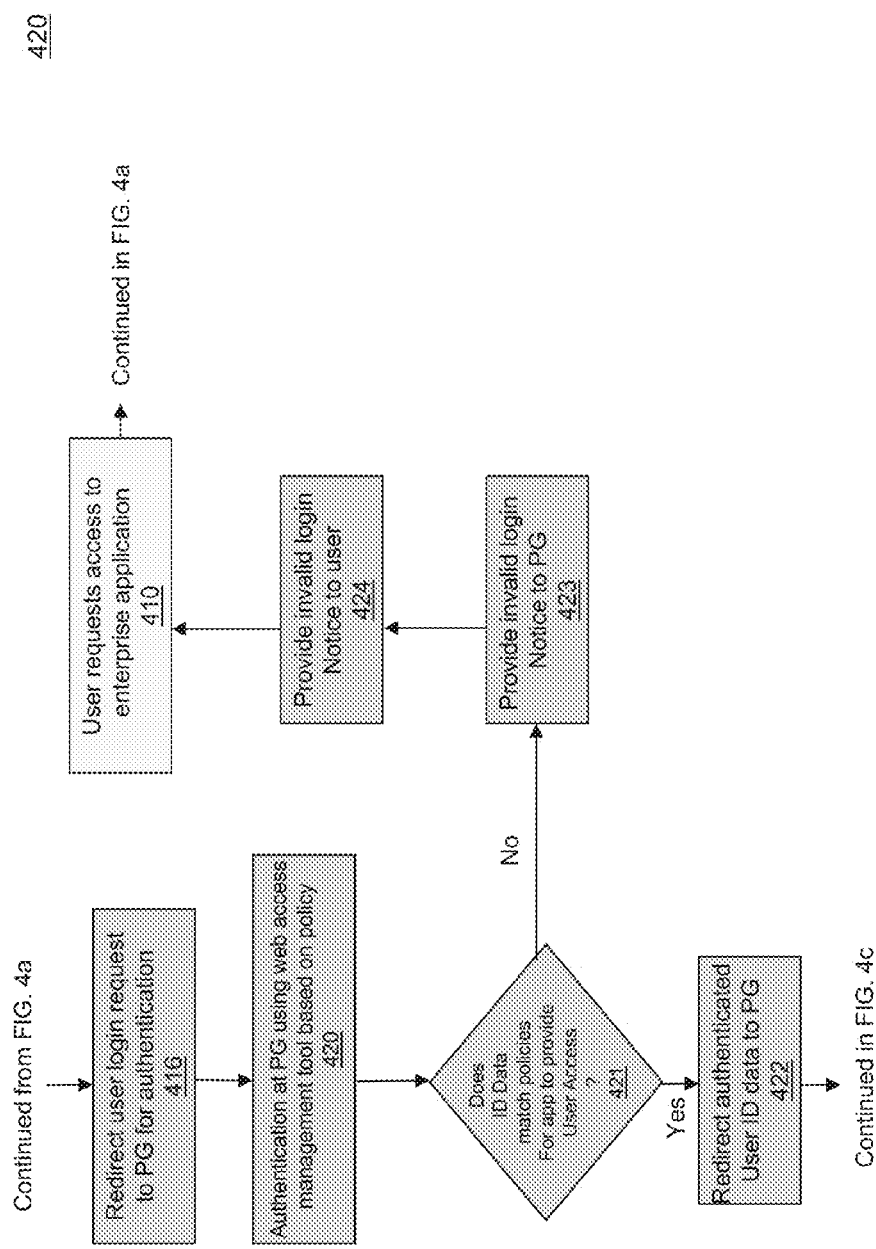
FIG. 4b is the second portion of the entire system flow chart.

FIGS. 4*a*-4*c* and FIG. 5 illustrate one embodiment of the invention. FIG. 4*a* illustrates the beginning of the process initiated by the user's request to access an application. FIG. 4*b* illustrates the authentication process initiated by a redirect from the access control module on the application server. FIG. 4*c* illustrates the validation of the proxy gateway and generation of a session cookie for an authenticated user. FIG. 5 illustrates one embodiment of the entire system and method.

For this illustrative embodiment, FIG. 4*a* depicts that beginning of the process, which is initiated when the user 310 requests access to an application 410 on an application server 330. It is understood that this is where the initial process begins; however, the user can make such a request throughout the process as shown in the flow charts of FIGS. 4*a*-5. Additional requests or repeat requests by the user 310 are therefore demonstrated in the flow chart by the indications that other parts of the process can be "Continued in FIG. 4*a*." Once a request to access an application 410 is made by a user 310, by either an initial or subsequent request, the login session request proceeds directly to the application server 330 where the login session request is then intercepted 411 by the access control module 360. Once intercepted by the access control module 411, the access control module 360 must determine whether to process the request through the authentication process 500 or to allow the request through to the application to allow a session to be created 414 between the user 310 and the application on the application server 330. First, the access control module 360 determines whether the user-operated computing device 310 already has a session established with the application 412. If a session exists and is already established by the user-operated computing device 310, a session is then recognized between the user and the application 414. Although not depicted herein the flow charts 410-430, 500 the invention 300 can, in another embodiment, also track how many times the user-operated computing device 310 has requested access to the application 410 as means of determining whether to allow the established session 414 to remain established with the application. Additionally, and alternatively, the invention 300 can, in yet another embodiment, also track how long the user-operated computing device 310 has had an established session with the application as means of determining whether to allow the established session 414 to remain established with the application.

If the user-operated computing device 310 does not have a session already established, the access control module 360 can then determine if the user-operated computing device 310 is requesting a session 413 with a protected URL. The access control module 360 determines whether the requested URL is on the ignore list 413 by comparing the requested URL with URLs listed in the ignore list. If the URL is on the ignore list, the access control module 360 ignores the request for the session, i.e. the access control module allows the user-operated computing device 310 to create an unauthenticated session with the application 414, i.e. create a session without intercepting the request and going through the authentication process. If the URL is not on the ignore list, the access control module 360 then determines whether the login session request has the proper identification attributes 415. In another embodiment, the list might instead or additionally contain a list of invalid proxy gateway IP addresses from which the access control module 360 can access to compare IP addresses of incoming proxy requests from proxy gateways, and if on the invalid proxy gateway list, the access control module 360 can send an invalid login notification to the proxy gateway.

For each application there can be various identification attributes set to determine whether the session credentials are valid. As an example, the user 310 can be required to submit in their request 410 session credentials consisting of certain identification attributes, i.e. characters, numerals, or combinations thereof. For instance, the session credentials can be required to have numerals followed by some combination of characters. As more specific example, the session credentials can be required to have two numerals followed by four non-consecutive numerals. If the identification attributes of the user's session credentials are improper 415, the user cannot authenticated and an invalid login notification is be provided 417 to the user. The user-operated computing device 310 upon receipt of the invalid login notification 417 can re-request access to an application by sending another login session request 410. If however the identification attributes of the user's session credentials are proper 415, the user can be able to be authenticated through the rest of the authentication process 500 and the access control module 360 redirects 317 the login session request to the proxy gateway 350 for authentication 416.

For this one embodiment, FIG. 4*b* continues from FIG. 4*a* where the access control module 360 redirects 317 the login session request to the proxy gateway 350 for authentication 416. When the redirect 317 from the access control module 360 via the user-operated computing device through 312 to the proxy gateway 350 is received at the proxy gateway 350, the proxy gateway proceeds to authenticate the user's session credentials using web access management based on policy 420. In a particular embodiment, the authentication process 420 can consist of the access management agents 320 collecting the user's session credentials and sending 313 them to an external policy server 340. The policy server 340 evaluates the user's session credentials against the policies saved on the web access management policy server 340. Once the policy server 340 determines whether the user 310 is validated or not 421 and sends the validation determination back 313 to the access management agent 320 resident on the proxy gateway 350. If the policy server 340 has determined that the user session credentials are invalid, the policy server 340 sends an invalid login notification 423 to the proxy gateway 350. The proxy gateway 350 then redirects the invalid login notification to the user 424. If the policy server 340 has determined that the user session credentials are valid, the policy server 340 sends a valid login notification 422 to the proxy gateway 350 including the authenticated user's session credentials 422.

For this one embodiment, FIG. 4*c* continues from FIG. 4*b* where the authenticated user's session credentials are redirected 422 back 313 to the access management agent 320 resident on the proxy gateway 350. Upon receipt of the authenticated user's session credentials 422, the proxy gateway 350 sends a proxy request 430 over a third communication channel 314, or back channel, which communicates the user's authenticated identity data to the access control module 360 on the application server 330. The proxy request is received 431 at the application server 330 by the access control module 360. Upon receipt of a proxy request over the back channel 431 from a proxy gateway 350, the access control module 360 determines whether the proxy gateway 350 is an approved gateway 432. In one embodiment, the access control module 360 can contain or have access to a list of approved proxy gateway IP addresses. When the proxy request is received 431 from the proxy gateway 350, the access control module can compare the IP address of the proxy gateway within the request to the list of approved proxy gateway IP addresses. If the proxy gateway's IP address is not within the list of approved proxy gateway IP addresses, the access control module 360 responds to the proxy gateway's proxy request over the back channel 315 with an invalid login notification 434. The invalid login notification 434 is redirected from the proxy gateway 350 to the user-operated computing device 435 via the second communication channel 316. Again, the user-operated computing device 310 can then proceed to re-request access 410 to the application or another application on the application server 330. If the proxy gateway's IP address is within the list of approved proxy gateway IP addresses, the access control module 360 sends a session cookie 436-438 as further described below.

In one embodiment, depicted as optional in FIG. 4c via dashed lines, the access control module 360 can be configured to have an additional authorization check based on identity data received via the proxy request 431 from the proxy gateway 350 to determine whether the user is valid 433. This optional authorization check 433 can check identity data, including identification attributes, session credentials or otherwise, to validate the user-operated computing device 310. It is understood that this optional authorization check 433 is in addition to any proxy gateway authentication check 432 that can be conducted by the access control module 360. If the authorization check 433 by the access control module 360 determines the identity data is invalid, the access control module 360 responds to the proxy gateway's proxy request over the back channel 315 with an invalid login notification 434. The invalid login notification 434 is redirected from the proxy gateway 350 to the user-operated computing device 435 via the second communication channel 316. If the authorization check 433 by the access control module 360 determines the identity data is valid, the access control module 360 responds to the proxy gateway's proxy request over the back channel 315 with a session cookie 436-438 as further described below.

If the proxy gateway 432, and the user's session credentials if so configured 433, are valid, the access control module 360 generates a session cookie for the requested application 436 to be provided to the user-operated computing device 310 for establishing a session with the application resident on the application server 330. The generated session cookie 436 is provided to the user-operated computing device 310 by the access control module 360 responding to the proxy request with the session cookie for the requested application 437. The proxy response with the session cookie 437 is sent back across the back channel 315 to the proxy gateway 350. The proxy gateway 350 then redirects the session cookie for the requested application 438 to the user-operated computing device 310 over the second communication channel 316. The user-operated computing device 310 can then use the provided session cookie to request access to the application 410. This subsequent request for access to the application 410 is done automatically by the redirection of the session cookie by the user-operated computing device 310 over the first communication channel 311 and does not involve a subsequent action by the user at the user-operated computing device 310. The subsequent request for access to the application 410 also brings the process 500 back at the beginning of the flow chart where the request is intercepted 411 by the access control module 360, except in this instance when the access control module inquires if the user-operated computing device has a session 412, the user-operated computing device 310 actually has a valid session via the session cookie and a session is established between the user-operated computing device 310 and the application 414 on the application server 330. The process 500 can then be restarted by the user requesting access to the same or another application 410 on the application server 330.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g. Microsoft® Internet Explorer® available from Microsoft Corporation, Mozilla® Firefox available from Mozilla Corporation).

One skilled in the art will realize the technology can be embodied in other specific forms without departing from the spirit or essential characteristics thereof. The foregoing embodiments are therefore to be considered in all respects illustrative rather than limiting of the technology described herein. All changes that come within the meaning and range of equivalency of the claims are therefore intended to be embraced therein.

What is claimed is:

1. A computer implemented method for providing access to an application resident on an application server, the method comprising:

receiving, from a user-operated computing device, a login session request at the application, the login session request comprising identity data for the user-operated computing device;

intercepting, via an access control module, the login session request;

transmitting, from the access control module, a redirect command indicating that no session exists for the user-operated computing device;

redirecting, via the user-operated computing device, the login session request to a proxy gateway, wherein the proxy gateway has an access management agent;

receiving, at the access control module, a proxy request from the proxy gateway with authenticated identity data for the user-operated computing device;

validating, at the access control module, that the proxy request was sent from the proxy gateway;

transmitting, to the user-operated computing device, from the access control module, a response to the proxy request comprising a session cookie generated by the access control module; and receiving, from the user-operated computing device, at the access control module, the session cookie for establishing a session between the user-operated computing device and the application.

2. The computer implemented method of claim 1 further comprising:

allowing, by the access control module, the user-operated computing device to establish the session; and establishing, by the user-operated computing device, the session with the session cookie.

3. The computer implemented method of claim 1, wherein the intercepting step further comprises:

comparing, by the access control module, identity data attributes within the login session request to specified identity data attributes;

determining, by the access control module, the identity data attributes are consistent with the specified identity data attributes; and creating, by the access control module, the redirect command indicating that no session exists for the user-operated computing device.

4. A computer implemented method for providing access to an application resident on an application server, the method comprising:

receiving, from a user-operated computing device, a login session request at the application, the login session request comprising identity data for the user-operated computing device;

intercepting, via an access control module, the login session request;

transmitting, from the access control module, a redirect command indicating that no session exists for the user-operated computing device;

redirecting, via the user-operated computing device, the login session request to a proxy gateway, wherein the proxy gateway has an access management agent;

receiving, at the access control module, a proxy request from the proxy gateway with authenticated identity data for the user-operated computing device;

validating, at the access control module, that the proxy request was sent from the proxy gateway;

transmitting, to the user-operated computing device, from the access control module, a response to the proxy request comprising a session cookie generated by the access control module;

receiving, from the user-operated computing device, at the access control module, the session cookie for establishing a session between the user-operated computing device and the application;
allowing, by the access control module, the user-operated computing device to establish a session;
establishing, by the user-operated computing device, a session with the session cookie; and
adding a uniform resource locator of the user-operated computing device to an ignore list.

5. The computer implemented method of claim 4, further comprising:
determining, by the access control module, that the requested uniform resource locator is on the ignore list;
ignoring, by the access control module, the login session request from the user-operated computing device; and
allowing, by the access control module, the user-operated computing device to establish the session without authentication.

6. The computer implemented method of claim 2, further comprising allowing, by the access control module, a number of subsequent requests by the user-operated computing device to the application in the established session without re-authentication.

7. The computer implemented method of claim 2, further comprising allowing, by the access control module, the established session to exist for an amount of time without re-authentication.

8. The computer implemented method of claim 1, further comprising validating, at the access control module, proxy requests from a plurality of proxy gateways.

9. The computer implemented method of claim 1, further comprising receiving, by the access control module, login session requests for a plurality of applications.

10. The computer implemented method of claim 9, further comprising updating, at the access control module, a list of applications whose login session requests are intercepted by the access control module.

11. The computer implemented method of claim 1, wherein the validating step further comprises:
comparing, at the access control module, an internet protocol address for the proxy gateway to a list of one or more valid proxy gateway internet protocol addresses; and
determining, at the access control module, the proxy gateway internet protocol address is in the list.

12. The computer implemented method of claim 1, wherein the validating step further comprises:
comparing, at the access control module, an internet protocol address for the proxy gateway to a list of one or more valid proxy gateway internet protocol addresses;
determining, at the access control module, the proxy gateway internet protocol address is not in the list; and
providing, to the user-operated computing device via the proxy gateway, a notice of an invalid login session request.

13. The computer implemented method of claim 1, wherein the redirecting step further comprises:
receiving, at the access management agent via the proxy gateway, the login session request;
determining, by the access management agent, that the application is a protected application;
gathering, by the access management agent, the identity data;
transmitting, by the access management agent, the identity data;
receiving, by the access management agent, authentication for the identity data for the user-operated computing device; and
providing, by the access management agent to the proxy gateway, the authenticated identity data.

14. The computer implemented method of claim 1, wherein the redirecting step further comprises:
receiving, at the access management agent, the login session request;
determining, by the access management agent, that the application is a protected application;
gathering, by the access management agent, the identity data;
transmitting, by the access management agent to a policy server, the identity data;
receiving, by the access management agent, a notice of invalid identity data; and
providing, to the user-operated computing device by the access management agent, the notice of invalid identity data.

15. A computer implemented process for establishing a login session for an application via a proxy gateway, the process comprising:
receiving, at a proxy gateway via a user-operated computing device, a login session request to an application, wherein the login session request comprises identity data and is received as a redirect command from an access control module indicating no session exists for the user-operated computing device;
authenticating, at the proxy gateway via at least one access management agent, identity data for the user-operated computing device;
transmitting, from the proxy gateway, a proxy request to the access control module;
receiving, from the access control module, a response to the proxy request at the proxy gateway, the response comprising a session cookie for the application; and
transmitting, by the proxy gateway to the user-operated computing device, the session cookie.

16. The computer implemented method of claim 15, wherein the receiving a response to the proxy request step further comprises:
receiving, from the access control module, a response to the proxy request at the proxy gateway, the response comprising a session cookie for the application indicating the proxy gateway is a valid proxy gateway.

17. The computer implemented method of claim 15, wherein the authenticating step further comprises:
receiving, at the proxy gateway, the login session request;
determining, by the at least one access management agent, that the application is a protected application;
gathering, by the at least one access management agent, the identity data;
transmitting, by the at least one access management agent, the identity data;
receiving, by the at least one access management agent, authenticated identity data for the user-operated computing device; and
providing, by the at least one access management agent to the proxy gateway, the authenticated identity data.

18. The computer implemented method of claim 15, wherein the authenticating step further comprises:
receiving, at the at least one access management agent, the login session request;
determining, by the at least one access management agent, that the application is a protected application;

gathering, by the at least one access management agent, the identity data;

transmitting, by the at least one access management agent, the identity data;

receiving, by the at least one access management agent, a notice of invalid identity data for the user-operated computing device; and providing, to the user-operated computing device by the at least one access management agent, the notice of invalid identity data.

19. A computer program product, tangibly embodied in a machine readable storage device, the computer program product including instructions being operable to cause a data processing apparatus to:

receive one or more login session requests, a login session request comprising identity data for a user-operated computing device to login to an application;

determine whether a session exists for the user-operated computing device;

redirect login session requests with no existing session to one or more proxy gateways;

authenticate the identity data;

transmit a proxy request with authenticated identity data to request a session cookie;

receive the proxy request via an access control module;

validate the proxy request was sent from a valid proxy gateway;

transmit a response to the proxy request with the session cookie;

redirect the session cookie to the user-operated computing device; and establish the session between the user-operated computing device and the application using the session cookie.

* * * * *